United States Patent Office 3,372,319
Patented Mar. 5, 1968

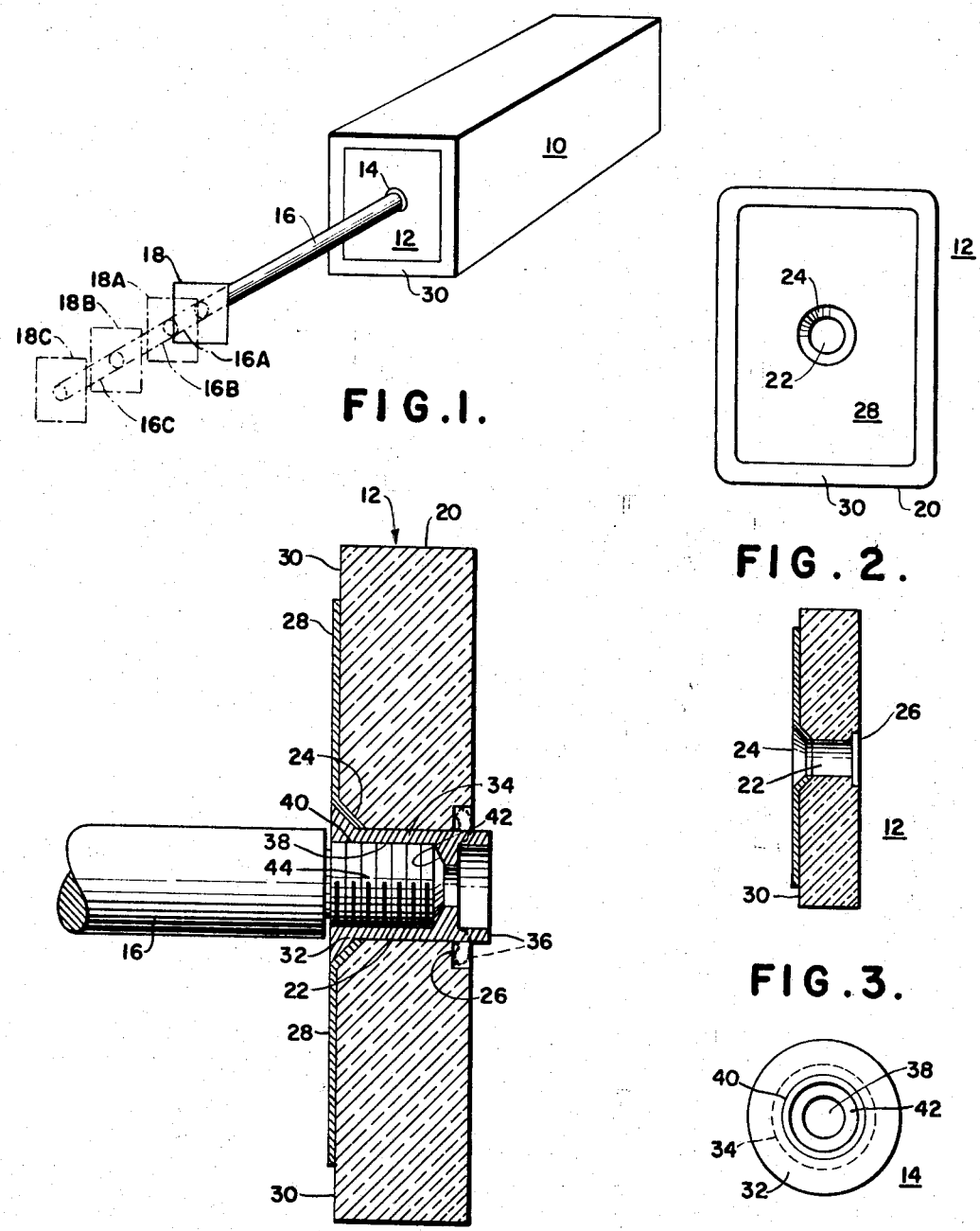

3,372,319
SENSING ELEMENT FOR PROXIMITY
DETECTORS AND THE LIKE
William E. Rhodes, Columbus, Ohio, assignor to Robertshaw Controls Company, Richmond, Va., a corporation of Delaware
Filed May 23, 1966, Ser. No. 552,068
6 Claims. (Cl. 317—256)

ABSTRACT OF THE DISCLOSURE

Capacitance type sensing elements are provided for extending the range of detection of proximity detecting devices, which sensing elements include a dielectric base plate in an exterior housing wall of the sensing device and conductive coupling means therein adapted to receive one end of an extended or elongated conductive support means maintaining a conductive plate or plates at selected distances from the sensing device.

---

This invention relates to proximity detection devices and more particularly to an improved and versatile variable impedance proximity detecting means for same.

In proximity detectors utilizing a change in impedance, such as capacitance, as the input variable to which the detector is calibrated to respond, caused by the predetermined proximity of an object to the detecting means or sensing element thereof, the range of proximity is limited by the position of the sensing element and the sensitivity of the associated detecting device. Accordingly, if the detecting device is mounted in a fixed position, the maximum range of proximity detection of which the device is capable is limited.

It is therefore, an object of this invention to provide a new and novel variable impedance detecting element effecting a wide variety of detection ranges for proximity detection devices.

It is another object of this invention to provide a new and novel variable capacitance detecting element for proximity detection devices wherein component parts thereof are readily replaceable to vary the proximity range capabilities of an associated detecting device.

These and other objects of this invention will become more fully apparent with reference to the following specification and drawings which relate to a preferred embodiment of the invention.

In the drawings:

FIGURE 1 is a perspective of a proximity detecting device including a variable capacitance sensing element of the present invention;

FIGURE 2 is a front plan view of that portion of the sensing element of the present invention integrated with the structure of the proximity detecting device;

FIGURE 3 is a side view of the sensing element of FIGURE 2;

FIGURE 4 is an enlarged partial cross-section of a detail of FIGURES 1, 2 and 3; and FIGURE 5 is a front plan view of a bushing of the present invention shown in FIGURES 1, 2, 3 and 4.

Referring in detail to the drawings and more particularly to FIGURE 1, a sensing element of the present invention is shown mounted on a proximity detecting device 10 or the like, such proximity detecting devices 10 are well known in the art and are exemplified in U.S. Patent 3,086,109 to Kaehms, and comprises a first electrically conductive plate means 12, integrated with the detecting device 10, having a centrally located socket means comprising a conductive bushing 14 therein, a conductive rod means 16 or like elongated conductive support means secured in the bushing 14 and extending outwardly from the first plate means 12 and a second conductive plate means 18 secured at the outer end of the rod. The second conductive plate means 18, in the embodiment shown is oriented such that its surface is parallel with the surface of the first plate means 12. It is to be understood, however, that the shape and relative orientation of the first and second plate means 12 and 18, respectively, and the shape and orientation of the rod means 16 may be readily varied to suit the particular conditions to be monitored by the device 10.

Further, as shown in phantom lines in FIGURE 1, additional plate means 18A, 18B, 18C—mounted on axial extensions 16A, 16B, 16C—of the conductive rod means 16, may be added if desired.

Additionally, the rod means 16 may be rigid or flexible as desired, a flexible wire or bead chain being exemplary of a flexible rod means 16.

Referring now to FIGURES 1, 2, 3, 4 and 5, the first plate means 12 is shown as including a glass or other suitable dielectric base plate 20 characterized by low electrical loss having a centrally located bore 22 therethrough, the outer end of the bore 22 comprising a countersunk portion 24 and the inner end of the bore 22 comprising an enlarged counter-bore 26.

The outer surface of the base plate 20 is coated with an electrically conductive layer 28 such as silver, the said conductive layer 28 extending into the countersunk portion 24 of the bore 22 or if desired, all the way through the bore 22.

The conductive layer 28 is affixed or otherwise deposited on the base plate 20 such that a substantially symmetrical margin 30 of uncoated glass is provided around the periphery of said conductive layer 28.

The first plate means 12 is completed by the insertion of the conductive bushing 14 into the bore 22 as will now be described with reference to FIGURES 4 and 5.

The bushing 14 includes a beveled head portion 32, which is conformally and coextensively juxtaposed in electrical contact with that portion of the conductive layer 28 in the countersunk portion 24 of the bore 22. A shank portion 34, shaped to conform to the bore 22 extends through the said bore 22 to a point beyond the inner surface of the base plate 20. The inner end of the shank 34 includes an upsettable periphery or flange 36 which is upset from the solid line position shown in FIGURE 5 to the dotted line position shown wherein the flange 36 is forced into the enlarged counterbore 26 to secure the bushing 14 in the bore 22 of the base plate 20.

The bushing 14 includes an internal stepped bore 38 having internal peripheral threads 40 extending from the front surface of the bushing 14 and base plate 20 to a beveled step 42 in the said stepped bore 38.

To complete the sensing element assembly for increasing the range of detection of the device 10, the conductive rod means 16 is provided with an externally threaded portion 44 adapted to be threaded into the stepped bore 38 of the bushing 14 to secure the said rod means 16 and its associated second plate means 18 to the first plate means 12.

The rod means 16 and bushing 14 can also be readily modified as a snap type or other quick detachable form of electrical coupling.

Thus, the present invention provides a new and novel means by which a detecting or monitoring device 10 with a fixed sensing element such as the novel first plate means 12 may be readily adapted to sense proximity of objects or other variable conditions at various selected distances and in various directions by merely inserting an extension into the fixed sensing element comprising the conductive rod or support means 16 and the second plate means 18 thereon; the rod means 16 and second plate means 18 being adapted to be made in a substantially infinite number of shapes and orientations to suit the particular conditions to be monitored in any given situation.

In some applications of the present invention, the conductive layer 28 on the first plate means 12 may be omitted, only one conductive surface comprising the second plate means 18 being necessary to effect operation of the detecting device 10, the latter comprising a conductive housing shell except for the dielectric portion 20 of the first plate means 12 in all embodiments of this invention.

Further, it is now readily apparent that by the use of a flexible wire or bead chain as the rod means 16, the detecting device 10 can be suspended above a doorway or the like at ceiling level and the second plate means 18 suspended on the flexible wire or bead chain in relatively close proximity to the doorway, whereby a simple and sensitive burglar or foreign presence alarm is effected.

Without further description it is believed that the advantages of the present invention over the prior art is apparent and while only one embodiment of the same is illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What is claimed is:

1. As an article of manufacture, an integral conductive exterior housing and capacitance sensing element for condition monitoring devices comprising a conductive housing including a dielectric base plate as an external wall portion thereof, an electrically conductive layer on said base plate within the peripheral bounds thereof, electrically conductive coupling means secured to said base plate in conductive contact with said conductive layer, an electrically conductive extended support element conductively coupled with said coupling means, and electrically conductive plate means conductively attached to said support element remote from said coupling means.

2. The invention defined in claim 1, wherein said coupling means comprises a bore through said conductive layer and said base plate having a countersunk portion into which said conductive layer extends, and a hollow electrically conductive bushing fixed in said bore in conductive contact with said conductive layer in said countersunk portion of said bore, said bushing having a socket portion therein removably and conductively receiving said support element.

3. The invention defined in claim 2, wherein said support comprises an elongated rod-like element having external threads on one end thereof; and wherein said socket portion in said bushing is internally threaded to removably receive said one end of said element.

4. As an article of manufacture, an integral conductive exterior housing and capacitance sensing element for condition monitoring devices comprising a conductive housing including a dielectric base plate as an external wall portion thereof, electrically conductive coupling means secured to said base plate, an electrically conductive extended support element conductively coupled with said coupling means, and electrically conductive plate means conductively attached to said support element remote from said coupling means.

5. The invention defined in claim 4, wherein said coupling means comprises a bore through said base plate and a hollow electrically conductive bushing fixed in said bore, said bushing having a socket portion therein removably and conductively receiving said support element.

6. The invention defined in claim 5, wherein said support means comprises an elongated rod-like element having an externally threaded coupling means on one end thereof; and wherein said socket portion in said bushing is internally threaded to removably receive said one end of said element.

References Cited

UNITED STATES PATENTS

| | | | |
|---|---|---|---|
| 1,608,085 | 11/1926 | Douglas | 317—249 |
| 1,733,983 | 10/1929 | Grier | 317—256 |
| 2,752,580 | 6/1956 | Shewmaker | 317—101 |
| 2,991,440 | 7/1961 | Kulka | 339—17 |

LARAMIE E. ASKIN, *Primary Examiner.*

E. GOLDBERG, *Assistant Examiner.*